United States Patent
Samway et al.

(10) Patent No.: US 7,424,402 B2
(45) Date of Patent: Sep. 9, 2008

(54) SYSTEM AND METHOD FOR MAKING SYNCHRONIZED SIGNAL MEASUREMENTS AT SPACED APART LOCATIONS

(75) Inventors: Robert Samway, Everett, WA (US); John Guilford, Stanwood, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 393 days.

(21) Appl. No.: 11/356,504

(22) Filed: Feb. 17, 2006

(65) Prior Publication Data

US 2007/0198220 A1    Aug. 23, 2007

(51) Int. Cl.
 *G06F 15/00* (2006.01)
(52) U.S. Cl. .................. 702/189; 455/456.1; 455/3.01; 455/67.16; 370/328; 370/350; 342/465
(58) Field of Classification Search ............. 702/189; 370/328, 350, 422, 260; 455/404.2, 456.1, 455/3.01, 67.16, 15, 440, 8, 450, 17, 509, 455/512, 517, 519, 520, 515, 14, 434; 342/450, 342/465, 451, 59; 340/825.01
See application file for complete search history.

(56) References Cited

U.S. PATENT DOCUMENTS

| 5,512,908 | A | * | 4/1996 | Herrick | ..................... 342/387 |
| 5,883,822 | A | | 3/1999 | Le Tourneur | |
| 6,704,547 | B2 | * | 3/2004 | Kuwahara et al. | ......... 455/67.16 |
| 6,765,531 | B2 | * | 7/2004 | Anderson | ................... 342/378 |
| 6,845,240 | B2 | * | 1/2005 | Carlson et al. | ........... 455/456.1 |
| 7,218,682 | B2 | * | 5/2007 | Mayor et al. | ................. 375/299 |
| 2002/0009974 | A1 | * | 1/2002 | Kuwahara et al. | .......... 455/67.6 |
| 2002/0186167 | A1 | * | 12/2002 | Anderson | ................... 342/465 |
| 2004/0147202 | A1 | * | 7/2004 | Brabrand | ................... 446/454 |
| 2005/0286448 | A1 | * | 12/2005 | Proctor et al. | ............... 370/279 |
| 2007/0042706 | A1 | * | 2/2007 | Ledeczi et al. | ............. 455/3.01 |
| 2007/0053340 | A1 | * | 3/2007 | Guilford | ..................... 370/350 |

OTHER PUBLICATIONS

EP Search Report dated Apr. 5, 2007.

* cited by examiner

*Primary Examiner*—Carol S Tsai

(57) ABSTRACT

A system and method is disclosed which allows for the simultaneous capturing of signals at a plurality of diverse locations. In one embodiment, all transmissions received at each location are recorded for a period of time and after that period of time the recorded transmission is discarded. When a determination is made at any one of the locations that the recorded transmission includes a particular signal configuration, the time of receipt of such particular signal configuration is marked and the recorded transmission at that location is maintained so as to preserve the particular signal. When a location detects a particular signal a control signal is then sent to the other locations to cause the other locations to also "freeze" their recorded transmissions so that the desired particular signal can be retrieved from the recorded transmission. At least a portion of the captured signals at all locations are then communicated to a common point for processing.

20 Claims, 2 Drawing Sheets

SYSTEM AND METHOD FOR MAKING SYNCHRONIZED SIGNAL MEASUREMENTS AT SPACED APART LOCATIONS

FIELD

This invention relates to making synchronized measurements at spaced apart locations and more particularly to systems and methods for making such measurements when the particular signal to be measured is not necessarily contained in a continuous transmission.

BACKGROUND

In order to make certain kinds of measurements it is necessary that multiple geographically dispersed instruments all measure the signal of interest at the same time. An example of such a measurement is locating the source of a radio transmission by comparing the time of arrival of the signal at several different locations. By knowing the difference in signal arrival times at the various instruments (Time Difference of Arrival or TDOA) and the speed of radio propagation, one can calculate the source of the signal. For continuous signals (e.g. a commercial radio station) it is relatively easy to schedule all the instruments to take a measurement at the same time (and hence measure the same portion of the signal). For non-continuous and unpredictable signals (such as a handheld push-to-talk radio) the problem is more difficult. Scheduling measurements at some future time does not necessarily result in useful measurements since it is unknown if the signal will be present at the scheduled time.

If the signal is strong enough that all the instruments (test devices) can detect when a transmission starts, a simple triggered measurement would suffice to capture synchronous measurements. However, in many situations one or more of the instruments may not "see" sufficient signal strength to reliably trigger. In these situations merely having each instrument trigger by itself is insufficient to make reliable measurements. Alternately, a first instrument can detect the beginning of a transmission and then communicate with the other instruments to schedule a synchronized measurement a short time in the future (how long in the future depends on the speed of the communication channel between the devices). This technique only works if the transmission length of the signal to be captured is longer than the delay between the instruments that are detecting the signal.

SUMMARY

A system and method is disclosed which allows for the simultaneous capturing of signals at a plurality of diverse locations even when the signals arrive at the different locations at different times and even when the signals themselves may not be strong enough (or formed well enough) to trigger the capture at each such location. In one embodiment, all transmissions received at each location are recorded for a period of time and after that period of time the recorded transmission is discarded. When a determination is made at any one of the locations that the recorded transmission includes a particular signal configuration, the time of receipt of such particular signal configuration is marked and the recorded transmission at that location is maintained so as to preserve the particular signal. When a location detects a particular signal a control signal is then sent to the other locations to cause the other locations to also "freeze" their recorded transmissions so that the desired particular signal can be retrieved from the recorded transmission even if the time of receipt of the particular transmission has passed. At least a portion of the captured signals at all locations are then communicated to a common point for processing.

In one embodiment, the transmission at each location is recoded in rolling blocks with the blocks being discarded as a whole, while in another embodiment a certain amount of the transmission is always maintained on a rolling forward basis.

DETAILED DESCRIPTION OF THE INVENTION

Figure 1:
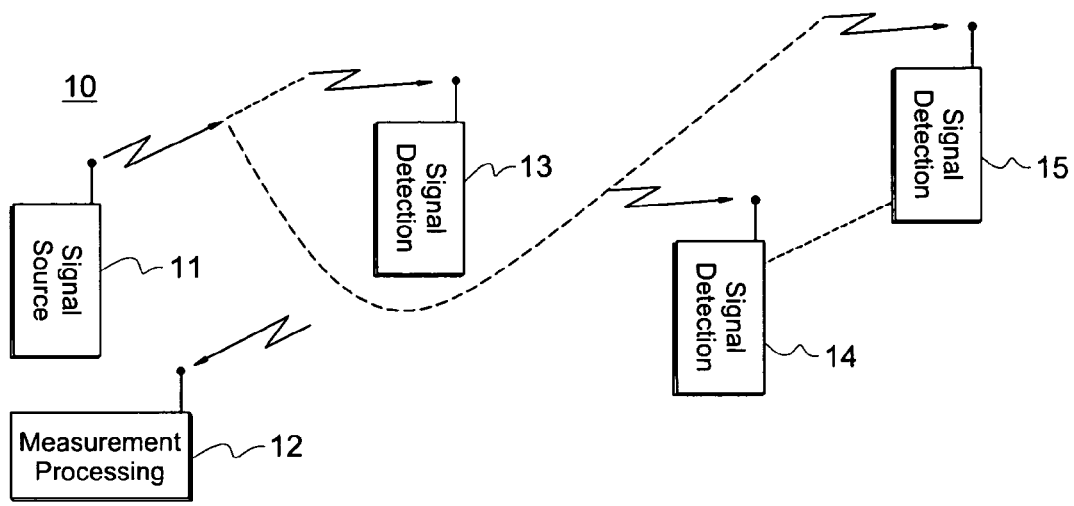
FIG. 1 illustrates one embodiment of a system employing the concepts of the invention.

FIG. 1 illustrates one embodiment of a system, such as system 10, employing the concepts of the invention. A signal source, such as signal source 11, emits a signal which could be either a continuous transmission or could be an intermittent (non-continuous) transmission. Contained in the transmitted signal could be a particular signal, such a simple pulse type signal with a certain amplitude and certain duration, or the particular signal could be a complex signal, perhaps at a certain frequency or certain set of frequencies. For example, the signal that is emitted could be an SOS type of signal in which the device that is sending the signal is, in effect, calling for help. In such a situation, the signal content or the signal form, or the signal frequency, or the signal content, would trigger an alert and the location of the sending device would be determined from the time difference of the signal receipt at various different locations, such as locations 13, 14, 15.

The devices at locations 13, 14, and 15 could be any type of device that recognizes the particular transmitted signal. Such devices could be specialty devices for just such a purpose or could be, for example, portions of other devices, such as cellular telephones, pagers, PDAs, or computers, that are mobile. Note that while just three such devices (13, 14, 15) are shown, any number of devices can be used, some of which can be portable and some (or all) could be at fixed locations.

As will be discussed hereinafter, when the particular signal has been captured at one or more locations 13, 14, 15 the captured signals from all of the locations are transmitted to a common processing device, such as the device at location 12. Device 12 can be stand alone, or can be in combination with one or more devices 13, 14, or 15.

The various receive devices can be in communication with each other using a communication channel, for example a wireless LAN (not shown), which allows them to communicate among themselves (peer to peer) possibly with some amount of delay. The inter-device communication could be, for example, via a public or private communication network. Devices, such as cell phones, computers, PDAs and test devices contain relatively large amounts of memory which allows for the capture of relatively long time records of signals. For example, devices might all for the capture of ten or more seconds of data. Instead of relying on each device to trigger at the same time from a given signal, each repeatedly makes independent measurements of incoming signals and records these incoming transmissions for a period of time. Each of these measurements are accurately time stamped so that the device knows the time corresponding to any point in the measured and recorded time record.

Prior to the particular signal of interest being detected, the measurements that are stored (say for ten seconds) are discarded at the end of the time period. While each of these measurements is being made, the device monitors the output of its trigger circuit (not shown) in order to detect when the signal of interest appears. This requires special hardware different from traditional trigger circuits which would start (or end) the (in this example) ten second data collection window. Once the collection is started, a traditional trigger circuit would do nothing more. However in this circuit, while the data record is being collected, the trigger circuit would continue to observe the received data. If the trigger circuit fires (detects the signal of interest), it immediately notifies the processor so that the processor can alert the other nodes, as will be discussed with respect to FIG. 3. Collection of the current data record proceeds just as if the trigger did not fire. In an alternative embodiment a separate trigger circuit could work in parallel to the traditional trigger circuit since the two trigger circuits need not be in the same circuit.

When any device detects the particular signal of interest, it immediately sends a message (control signal, such as control signal 136) to the other devices and at the same time "freezes" the currently stored measurements (instead of discarding them as would occur if no signal of interest is detected). Control signal 136 then causes the other devices to also "freeze" their currently stored measurements. Each device then looks backward in its respective time record to extract the piece of their time record corresponding to the desired signal. For example, if device A detects a signal starting at 12:23:51, that device sends that time to the other devices, B and C. Devices B and C then can look back into their respective buffers and find the data signal that started at 12:23:51 whether or not each device could independently determine if there is a signal of interest or not. The captured particular signal is then sent to a central location from each device for further processing (e.g. a TDOA measurement).

If the length of the particular signal is short relative to the length of the time record and if the communication delay between devices is short relative as compared to the length of the time record, then there is a high probability that some, if not all, of the instruments will have captured the desired particular signal in the stored transmission segment.

Figure 2:
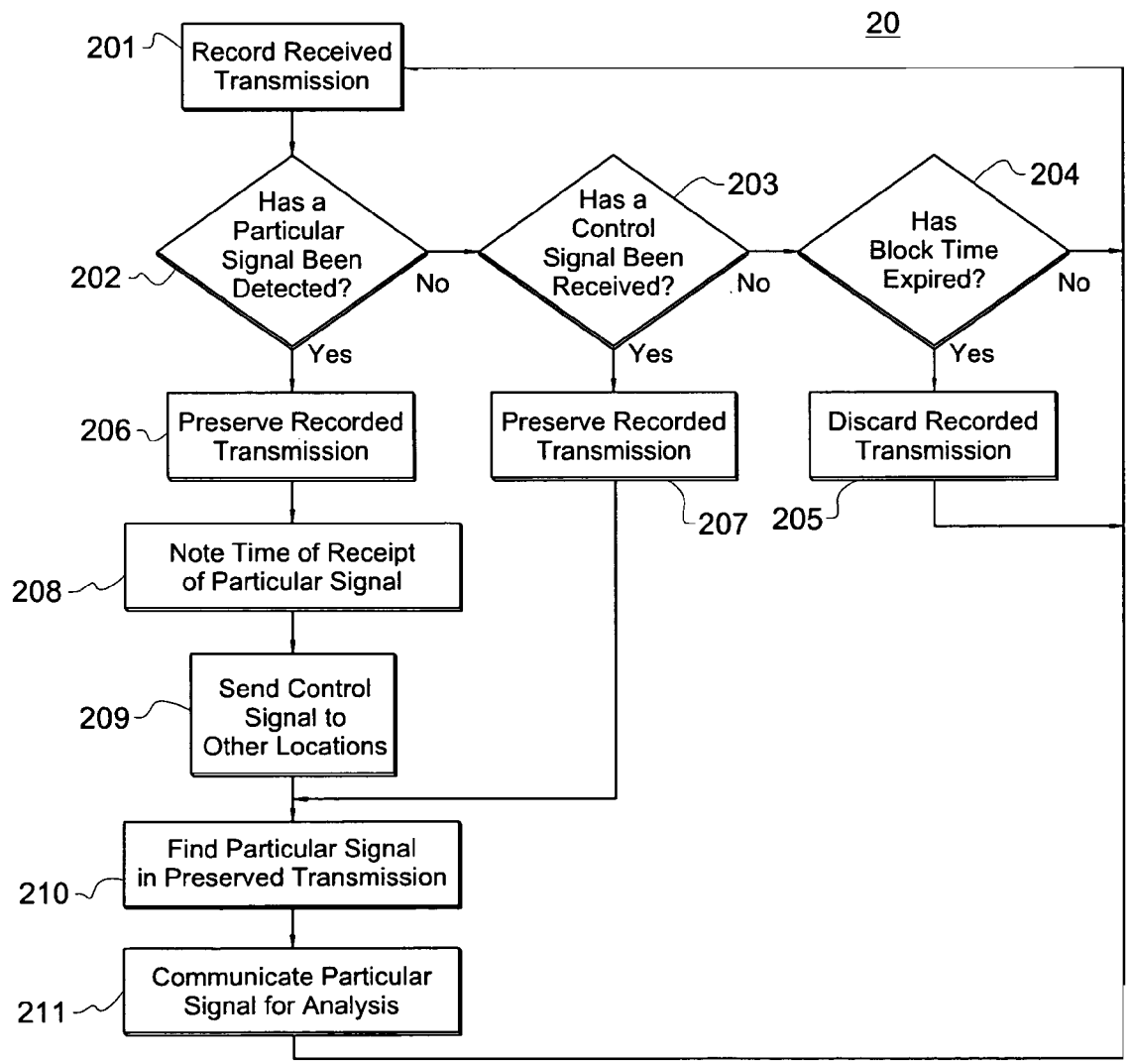
FIG. 2 shows a flowchart of one embodiment of the operation of the system shown in FIG. 1.

FIG. 2 shows flowchart 20 of one embodiment of the operation of the system shown in FIG. 1. In process 201 the incoming transmission is received and recorded for a period of time. As shown in one example with respect to FIG. 3, this period of time is ten seconds, but it could be any period of time depending upon memory capacity. Note that process 201 records received transmissions, and in some situations this can actually be a null-set (no signal source currently transmitting) such that there are no transmissions being received. Thus, the recording could essentially be a recording of blank airtime.

Process 202 determines if a particular signal has been detected. If not, process 203 determines if a control signal (such as control signal 136, FIG. 3) from another device (or associated with another device) has been received. If the particular signal has not been detected and a control signal has also not been detected, and if block time has expired, as determined by process 204, then process 205 discards the recorded transmission. If the block time has not expired, then the device continues recording received signals via process 201.

If the particular signal is detected (process 202) then the recorded transmission is preserved (i.e., the discarding of process 205 has been inhibited) and the time of receipt of the non-discarded signal is determined by process 208 and a control signal (such as control signal 136, FIG. 3) is sent to other devices.

If process 303 determines that a control signal has been received from another device, then process 207 preserves the recorded transmission at the control signal receiving device.

Process 210, at each device, then finds the particular signal which is part of the non-discarded recorded signal an in cooperation with process 211 communicates the particular signal, which may be the entire recorded signal or a portion thereof, to a common point, such as to measurement processing location 12, FIG. 1.

As discussed, if either a particular signal has been detected via process 202 or a control signal has been received via process 203, the recorded transmission would be preserved via either process 206 or process 207. This preservation is for a period of time, as will be discussed. The preserved recorded transmission is now available for review and assuming a control signal has been received, the control signal will have with it a time stamp that allows the preserved transmission to be reviewed at that time. Each device extracts a portion of the data that corresponds to the time the signal was initially seen as contained in the control signal. The amount of data extracted by each device is dependent on the type of signal and the measurement application. The extracted data set, along with the time of the first item in the set, is then communicated to the common point. In this embodiment, the device that receives a control signal does not try to identify the signal of interest within its recorded data, but sends that data to an external location for processing.

Measurement processing system 12 receives the various signal receipt times from the different locations and by processing those signals location and other calculations are possible. For example, system 12 can calculate the source of the signal, at least in terms of distance from the respective signal detection devices and by means of triangulation, or otherwise, can determine the geographical location of signal source 11.

Figure 3:
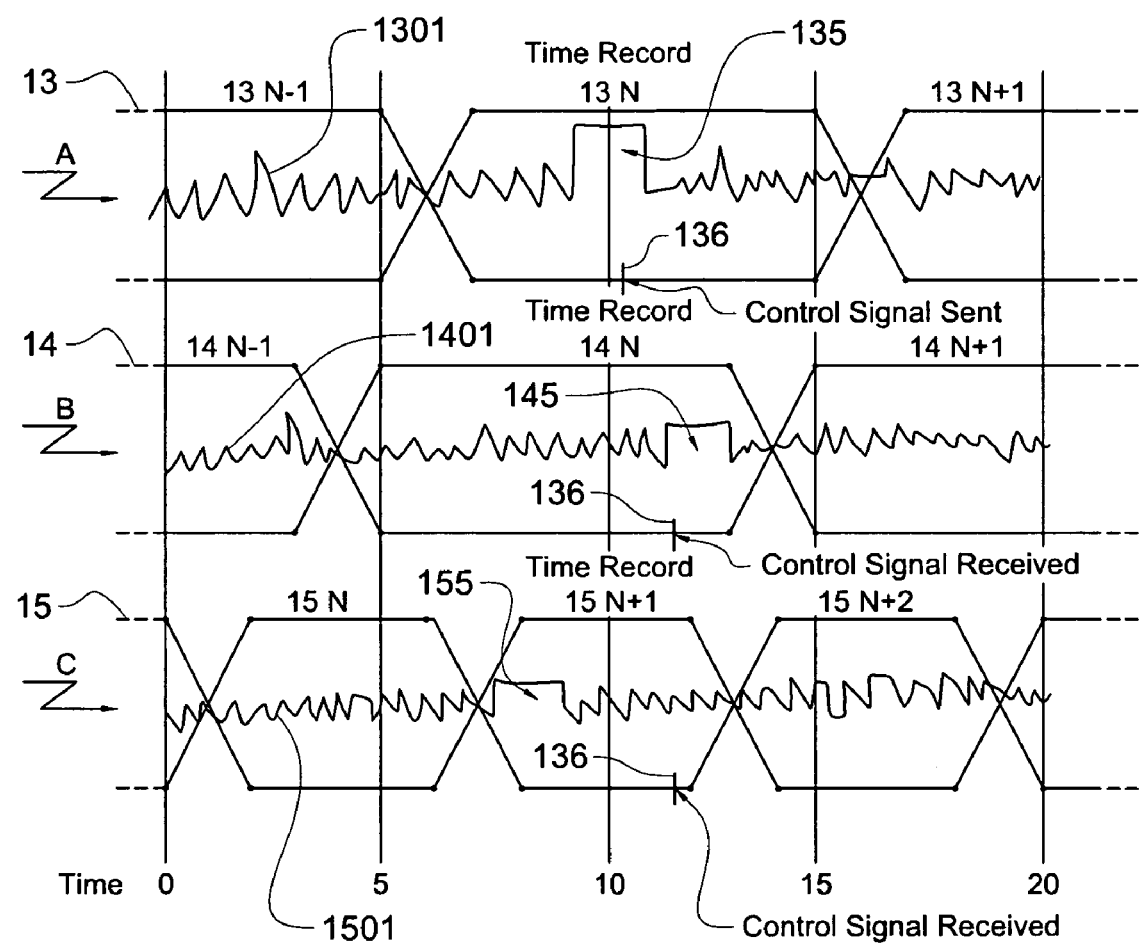
FIG. 3 shows time lines at three locations illustrating the synchronous capture of particular signals even when those signals are part of a non-continuous transmission.

FIG. 3 shows timelines at three locations 13, 14, and 15 illustrating the synchronous capture of particular signals, even when those signals are part of a non-continuous transmission. Each channel 13, 14, and 15, which can be thought of as signals A, B, and C, respectively, and are shown with three time records. For Channel 13 these are time records 13N−1, 13N, and 13N+1. Channel 14 is shown with time records 14N−1, 14N, and 14N+1. The time records for channel 15 are 15N, 15N+1, and 15N+2. Note also that the time records for each channel (which advantageously could be ten seconds, but could be any length desired) are not shown as being exactly the same place with respect to time. Thus, record 13N begins at approximately six seconds and ends at approximately 16 seconds. Time record 14N starts at approximately four seconds and ends at approximately 14 seconds. Time record 15N starts at time one second, ends at time eight seconds, with time record 15N+1 starting at eight seconds and going through 13 seconds.

Assume now that a particular signal of interest 135 arrives on channel A centered around the ten second mark. Accordingly, signal 135, which is the particular signal of interest, is roughly in the middle of time record 13N which is being recorded at this period of time. Previously recorded time record 13N−1 can be discarded at this point, if desired. Control signal 136 is immediately sent from device 13, at approximately 11 seconds, to the other devices, 14 and 15. This control signal is received at device 14 at approximately 13 seconds and at device 15 at approximately 12 seconds.

Had the control signals not been received at channels 14 and 15, time records 14 and 15N+1, respectively, would have been discarded at the conclusion (or shortly thereafter) of their respective time periods. But since the control signals have been received, those time records are maintained (frozen) allowing the system to then look backward within the respective time records to find the particular signals of interest, namely signals 145 and 155 in channels B and C, respectively.

There can be several reasons why the signals of interest are not detected by detectors at devices 14 and 15. For example, the signal strength may not have been sufficient to trigger the detector, or the shape had been altered in transmission in some way. In any event, the signals have been captured and frozen because they were received in a block of time that is being preserved. Thus, it is possible to determine the time that each such signal was recorded at each respective device. This time, along with a copy of whatever was recorded during that time period is transmitted, as discussed above, to measurement processing device 12 for further processing under control of process 209.

For example, device 13 would send an indication that the particular signal 135 arrived at time 10 seconds. Device 12 would send an indication that signal 145 arrived at 13 seconds and device 15 would send an indication that signal 155 arrived at 8½ seconds. Note that with respect to device 15, the control signal is received from device 13 after the particular signal of interest 155 had been recorded and theoretically gone from the transmission stream. However, because the time block (block 15 N+1) had been recorded and frozen when the control signal arrived, it is possible to simultaneously capture the desired signal at spaced apart detection locations.

Note also that while a continuous wave form has been shown in FIG. 3, on channels A, B, and C, this has been done for ease of illustration. For a non-continuous transmission, only signals 135, 145, and 155 would be captured, and the remainder of each time block would show as empty since the system would be recording "dead air," i.e., the lack of signals between pulses. This is so since a particular device may not know a priori whether a signal is there or not, it has to capture everything. It may be that the device later receives a control signal from another device telling it that there was a signal at some particular time, at which time the receiving device will extract the pertinent section of the captured data for further analysis.

Also note, that while FIG. 3 shows specific blocks being recorded and discarded, these blocks could be rolling times and the period could be, for example, a continuous 10 second interval recorded with a new time added on and a time taken off the front end. When a control signal occurs, then the current 10 second rolling block would be frozen. When the desired data is captured and sent to system 12, the frozen data can be discarded (process 205, FIG. 2), and if additional recording has been stopped (for lack of memory or otherwise) it can be restarted.

Note that the devices need not all send the same type of data to processing system 12, provided only that the data sent can be used to determine the parameter desired for the processing center.

There is the possibility that the desired portion of the signal might straddle two different time capture blocks (either for the triggering device or the device receiving the trigger message). In this case, a valid measurement may not be possible and the device should restart the recording and wait for the next signal of interest.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for synchronously detecting a specific signal at a plurality of spaced apart locations; said method comprising:
  at each of said locations, recording signals received on a rolling block basis;
  at each of said locations, discarding previously recorded blocks upon the beginning of each new recorded block;
  at one of said locations, detecting a specific signal at a particular time T1;
  at said location, inhibiting said discarding of a recorded block of signals containing signals spanning said particular time;
  at said location, upon detecting said specific signal, sending a control signal to at least one target other one of said locations;
  at said target location, upon receipt of said control signal at time T2, inhibiting said discarding of a recorded block of signals containing signals spanning said time T2; and
  at said location and at said target location sending at least a portion of said non-discarded recorded block of signals to a common detection system.

2. The method of claim 1 wherein said specific signal is not part of a continuous transmission.

3. The method of claim 1 further comprising:
  at least one other of said locations, upon receipt of a control signal from either said location or said target location at time T3, inhibiting said discarding of a recorded block of signals containing signals spanning said time T3; and
  at said at least one other location sending at least a portion of said non-discarded recorded block of signals to said common detection system.

4. The method of claim 3 wherein said sending time of said control signal between locations is not necessarily the same for any set of locations.

5. The method of claim 1 wherein each said block of recorded signals is a multiple of the time duration of said specific signal.

6. The method of claim 1 wherein the start and stop times for said block of recorded signals at a location are not identical with the start and stop times of a block of recorded signals at other ones of said locations.

7. The method of claim 1 wherein the length of said block of recorded signals at a location is not identical with the length of a block of recorded signals at other ones of said locations.

8. The method of claim 3 further comprising:
  determining at said common detection system the location from which said specific signal was transmitted; said determining being based, at least in part, on an extracted time of arrival of said signals at said location, at said target location and at said at least one other location.

9. A system for obtaining measurements from a plurality of locations, said measurements pertaining to signals received at said locations; said system comprising:
- a first device comprising:
  - a signal receiver;
  - a memory for storing signals received by said signal receiver;
  - circuitry operable after a period of time for discarding from said memory stored ones of said signals; and
  - triggering circuitry operable upon receipt of a specific signal for sending a control signal to at least one other device; said triggering circuitry also operable for inhibiting for a period of time said discarding circuitry so as to capture said specific signal;
- a second device comprising:
  - a signal receiver;
  - a memory for storing signals received by said signal receiver;
  - circuitry operable after a period of time for discarding from said memory stored ones of said signals; and
  - circuitry operable upon receipt of a control signal for inhibiting for a period of time said discarding circuitry so as to capture said specific signal within said signals stored in said second device memory.

10. The system of claim 9 wherein said first device further comprises:
- circuitry for communicating to a signal processing location data from which a determination can be made as to the time said first device captured signal was received by said first device;

wherein said second device further comprises:
- circuitry for communicating to said signal processing location data from which a determination can be made as to the time said second device captured signal was received by said second device.

11. The system of claim 10 further comprising:
- processing circuitry at said signal processing location for determining, based upon data sent from said first device and at least two of said second devices, the location from which said specific signal was transmitted.

12. The system of claim 10 further comprising:
- processing circuitry at said signal processing location for determining the time difference of arrival at said first and second devices of said captured signals.

13. The system of claim 9 wherein said period of time prior to discarding said stored signals is not necessarily the same for said first and second devices.

14. A system for synchronously detecting a specific signal at a plurality of spaced apart locations; said system comprising:
- a first device comprising:
  - means for storing signal transmission streams received by said first device;
  - means for discarding stored ones of said transmission streams after a period of time;
  - means for enabling a control signal to be communicated to other ones of said devices, said enabling means operable upon receipt of a specific signal within a recorded signal transmission stream; said enabling means further operable for capturing said specific signal; and
  - means for communicating to a signal processing location at least a portion of said captured signal;
- a second device comprising:
  - means for storing signal transmission streams received by said second device;
  - means for discarding stored ones of said transmission streams after a period of time;
  - means operable upon receipt of a control signal from said first device for inhibiting for a period of time the enabling of said discarding means so as to capture said specific signal within said signal transmission stream stored in said second device memory; and
  - means for communicating to said signal processing location at least a portion of said second device captured specific signal.

15. The system of claim 14 further comprising:
- means at said signal processing location for determining the time difference of arrival at said first and second devices of said captured signals.

16. The system of claim 14 wherein said period of time prior to discarding said stored signals is not necessarily the same for said first and second devices.

17. A method of simultaneously capturing signals at a plurality of diverse locations, said signals transmitted from a common point, said method comprising:
- recording signal transmissions from said common point at all of said locations for a fixed period of time;
- at anyone of said locations, upon determination that a said recorded signal transmission includes a particular signal configuration, marking the time of said determination at said particular location and extending said fixed period of time at said location so as to preserve said recoding of said transmission containing said particular signal configuration at said particular location;
- sending, from said particular location, to said others of said plurality of locations a control signal, said control signal triggered by said determination; and
- extending said period of time at each of said others of said plurality of locations so as to preserve at each of said other locations said recording of said transmission containing said particular signal at said other locations, said extending triggered at said others of said plurality of locations by receipt of said control signal from said particular location.

18. The method of claim 17 further comprising:
- communicating at least a portion of each preserved particular signal at each said location the receipt time said particular signal to a common processing point.

19. The method of claim 18 wherein said fixed period of time for recording is not necessarily the same at all locations.

20. The method of claim 18 further comprising:
- at said common processing point determining from communicated ones of said preserved particular signals at least the time difference of arrival of said particular signals at each of said locations.

* * * * *